United States Patent
Moyer et al.

(10) Patent No.: US 8,364,937 B2
(45) Date of Patent: Jan. 29, 2013

(54) EXECUTING MISALIGNED LOAD DEPENDENT INSTRUCTION IN SECOND EXECUTION STAGE IN PARITY PROTECTED MODE IN CONFIGURABLE PIPELINED PROCESSOR

(75) Inventors: William C. Moyer, Dripping Springs, TX (US); Jeffrey W. Scott, Austin, TX (US)

(73) Assignee: Rambus Inc., Sunnyvale, CA (US)

( * ) Notice: Subject to any disclaimer, the term of this patent is extended or adjusted under 35 U.S.C. 154(b) by 0 days.

(21) Appl. No.: 13/446,930

(22) Filed: Apr. 13, 2012

(65) Prior Publication Data

US 2012/0204012 A1 Aug. 9, 2012

Related U.S. Application Data

(62) Division of application No. 12/872,771, filed on Aug. 31, 2010, now Pat. No. 8,190,860, which is a division of application No. 12/112,583, filed on Apr. 30, 2008, now Pat. No. 7,814,300.

(51) Int. Cl.
*G06F 9/38* (2006.01)

(52) U.S. Cl. ........................ 712/219; 712/225

(58) Field of Classification Search ........................ None
See application file for complete search history.

(56) References Cited

U.S. PATENT DOCUMENTS

| | | | | |
|---|---|---|---|---|
| 4,201,337 A | 5/1980 | Lewis et al. | ..................... | 371/37 |
| 5,488,691 A | 1/1996 | Fuoco et al. | ............ | 395/185.05 |
| 5,522,052 A | 5/1996 | Inoue et al. | ................... | 395/375 |
| 5,555,250 A | 9/1996 | Walker et al. | ................ | 371/40.1 |
| 5,619,664 A | 4/1997 | Glew | ............................ | 395/394 |
| 5,630,055 A | 5/1997 | Bannon et al. | ............ | 395/185.05 |
| 5,778,208 A * | 7/1998 | Eickemeyer et al. | ......... | 712/203 |
| 5,778,250 A | 7/1998 | Dye | .......................... | 395/800.32 |
| 5,884,057 A | 3/1999 | Blomgren et al. | ............ | 395/375 |
| 5,900,016 A * | 5/1999 | Ghosh | .......................... | 711/143 |
| 5,961,660 A | 10/1999 | Capps, Jr. et al. | ............. | 714/763 |
| 5,966,389 A | 10/1999 | Kiehl | ............................ | 371/40.1 |
| 6,012,138 A | 1/2000 | Worrell | ........................ | 712/209 |
| 6,092,182 A | 7/2000 | Mahalingaiah | ................ | 712/213 |
| 6,654,925 B1 | 11/2003 | Meaney et al. | ................ | 714/763 |
| 6,804,799 B2 | 10/2004 | Zuraski, Jr. | ....................... | 714/54 |
| 6,889,317 B2 | 5/2005 | Sami et al. | ..................... | 712/218 |
| 7,254,748 B1 | 8/2007 | Wright et al. | ................... | 714/43 |
| 2002/0029365 A1 | 3/2002 | Sato et al. | ...................... | 714/763 |
| 2002/0087839 A1 | 7/2002 | Jarvis et al. | ................... | 712/218 |
| 2005/0071830 A1 * | 3/2005 | Naveh | ........................... | 717/151 |
| 2006/0123320 A1 | 6/2006 | Vogt | ............................. | 714/762 |

(Continued)

FOREIGN PATENT DOCUMENTS

EP  0418457 B1  10/1997

OTHER PUBLICATIONS

Haiao, M. Y.; "A Class of Optimal Minimum Odd-weight-column SEC-DED Codes"; Jul. 1970, pp. 395-401, 7 pages.

(Continued)

*Primary Examiner* — Kenneth Kim
(74) *Attorney, Agent, or Firm* — Finnegan, Henderson, Farabow, Garrett & Dunner, L.L.P.

(57) ABSTRACT

A method includes providing a data processor having an instruction pipeline, where the instruction pipeline has a plurality of instruction pipeline stages, and where the plurality of instruction pipeline stages includes a first instruction pipeline stage and a second instruction pipeline stage. The method further includes providing a load instruction and a data-dependent instruction to the instruction pipeline. Based on an operating mode, such as ECC mode or parity mode, the data-dependent instruction may execute in either the first of the second instruction pipeline stage. Further, the execution of the data-dependent instruction may depend on whether the most recently executed instruction was misaligned.

5 Claims, 11 Drawing Sheets

U.S. PATENT DOCUMENTS

| | | | |
|---|---|---|---|
| 2006/0224864 A1 | 10/2006 | DeMent et al. | 712/219 |
| 2009/0177875 A1 | 7/2009 | Moyer et al. | 712/238 |

OTHER PUBLICATIONS

U.S. Appl. No. 12/014,594, filed Jan. 15, 2008, 43 pages.

Freescale Semiconductor, Inc.; MPC7450 RISC Microprocessor Family Reference Manual; Jan. 2005; Cover Page, pp. 2-27 thru 2-41 and 3-49 thru 3-56; Rev. 5, 25 pages.

PCT Application No. PCT/US2009/034871 for related U.S. Appl. No. 12/112,580; Search Report and Written Opinion mailed Sep. 28, 2009, 11 pages.

Moyer, William, U.S. Appl. No. 12/112,580, filed Apr. 30, 2008 re Office Action dated May 25, 2011, includes Notice of References Cited and Information Disclosure Statement, 21 pages.

Moyer, William, U.S. Appl. No. 12/112,583, filed Apr. 30, 2008, Notice of Allowance dated Jun. 16, 2010, 5 pages.

Moyer, William, U.S. Application No. 12/872,771, filed Aug. 31, 2010 re Response dated Nov. 28, 2011 to the Office Action mailed Jul. 28, 2011, 6 pages.

Moyer, William, U.S. Appl. No. 12/872,771, filed Aug. 31, 2010, Notice of Allowance and Fee(s) Due mailed Jan. 13, 2012, 8 pages.

Moyer, William, U.S. Appl. No. 12/872,771, filed Aug. 31, 2010, Office Action dated Mar. 16, 2011, includes Notice of References Cited and Information Disclosure Statement, 13 pages.

Moyer, William, U.S. Appl. No. 12/112,583, filed Apr. 30, 2008, Office Action dated Oct. 26, 2009, 6 pages.

Moyer, William, U.S. Appl. No. 12/112,583, filed Apr. 30, 2008, Restriction Requirement dated Apr. 9, 2010, 4 pages.

Moyer, William, U.S. Appl. No. 12/872,771, filed Aug. 31, 2010, Restriction Requirement dated Feb. 10, 2011, 4 pages.

Moyer, William, U.S. Appl. No. 12/112,583, filed Apr. 30, 2008, Restriction Requirement dated Sep. 9, 2009, 4 pages.

* cited by examiner

LATE WRITE BUFFER 102

| ADDR | DATA | CHECK BITS | SIZE | V |

*FIG. 5*

| STAGE | DESCRIPTION |
|---|---|
| IF0 | INSTRUCTION FETCH FROM MEMORY, STAGE 0 |
| IF1 | INSTRUCTION FETCH FROM MEMORY, STAGE 1 |
| DEC/RF READ/EA | INSTRUCTION DECODE/REGISTER READ/OPERAND FORWARDING/MEMORY EFFECTIVE ADDRESS GENERATION |
| E0/M0 | INSTRUCTION EXECUTION STAGE 0/MEMORY ACCESS STAGE 0 |
| E1/M1 | INSTRUCTION EXECUTION STAGE 1/MEMORY ACCESS STAGE 1 |
| WB | WRITE BACK TO REGISTERS |

*FIG. 6*

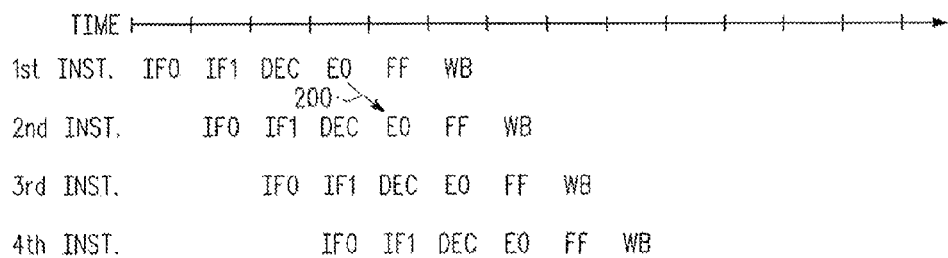

BASIC PIPELINE FLOW, SINGLE-CYCLE INSTRUCTIONS, PARITY MODE

*FIG. 7*

PIPELINE FLOW, SINGLE CYCLE INSTRUCTIONS, ECC MODE

PIPELINE FLOW, LOAD INSTRUCTIONS, PARITY MODE

PIPELINE FLOW, LOAD INSTRUCTIONS, ECC MODE

```
TIME  |----|----|----|----|----|----|----|----|----|----|----|--->
1st ST INST.  IF0  IF1  DEC/M0  (FF)  (WB)
                        EA
2nd ST INST.       IF0  IF1  DEC/M0  (FF)  (WB)
                             EA
3rd INST.               IF0  IF1  DEC  E0  (FF)  (WB)
(SINGLE CYCLE)
```

PIPELINE FLOW, STORE INSTRUCTIONS, PARITY MODE

*FIG. 11*

```
TIME  |----|----|----|----|----|----|----|----|----|----|----|--->
1st ST INST.  IF0  IF1  DEC/M0  M1  WB
                        EA
2nd ST INST.       IF0  IF1  DEC/M0  M1   WB
                             EA      (WRITE PREV ST DATA FROM 1st ST
                                      INSTRUCTION FROM LATE WRITE BUFFER)
3rd INST.               IF0  IF1  DEC  —  E1  WB
(SINGLE CYCLE)
```

PIPELINE FLOW, STORE INSTRUCTIONS, ECC MODE

*FIG. 12*

EXECUTING MISALIGNED LOAD DEPENDENT INSTRUCTION IN SECOND EXECUTION STAGE IN PARITY PROTECTED MODE IN CONFIGURABLE PIPELINED PROCESSOR

This application is a division of U.S. application Ser. No. 12/872,771, filed Aug. 31, 2010 now U.S. Pat. No. 8,190,860, which is a division of U.S. application Ser. No. 12/112,583, filed Apr. 30, 2008, now U.S. Pat. No. 7,814,300, both of which are incorporated herein by reference.

CROSS-REFERENCE TO RELATED APPLICATION(S)

This application is related to U.S. patent application Ser. No. 12/112,580, filed on even date, entitled "Selectively Performing a Single Cycle Write Operation With ECC in a Data Processing System," naming William C. Moyer and Jeffrey W. Scott as inventors, and assigned to the current assignee hereof.

BACKGROUND

1. Field

This disclosure relates generally to data processing systems, and more specifically, to a configurable pipeline based on an error detection mode.

2. Related Art

Error correction code (ECC) and parity are commonly used to provide error detection and/or error correction for memories. Typically, ECC supports a higher level of error detection at a reduced performance as compared to using parity. Furthermore, certain users of a particular memory place a higher emphasis on error detection than others and are willing to sacrifice some performance to obtain a certain level of safety certification. Other users are not as stringent with respect to error detection and are therefore not willing to sacrifice performance for additional error detection capabilities. Furthermore, different error detection and/or error correction schemes affect execution timing within a processor instruction pipeline differently.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 5 illustrates in diagrammatic form the late write buffer of FIG. 4 in accordance with one embodiment of the present invention;

FIG. 6 illustrates a table of pipeline stages of the data processing system of FIG. 1 in accordance with one embodiment of the present invention;

FIGS. 7-17 illustrate timing diagrams of various different examples of pipeline and execution timing in accordance with various embodiments of the present invention.

DETAILED DESCRIPTION

Figure 1:
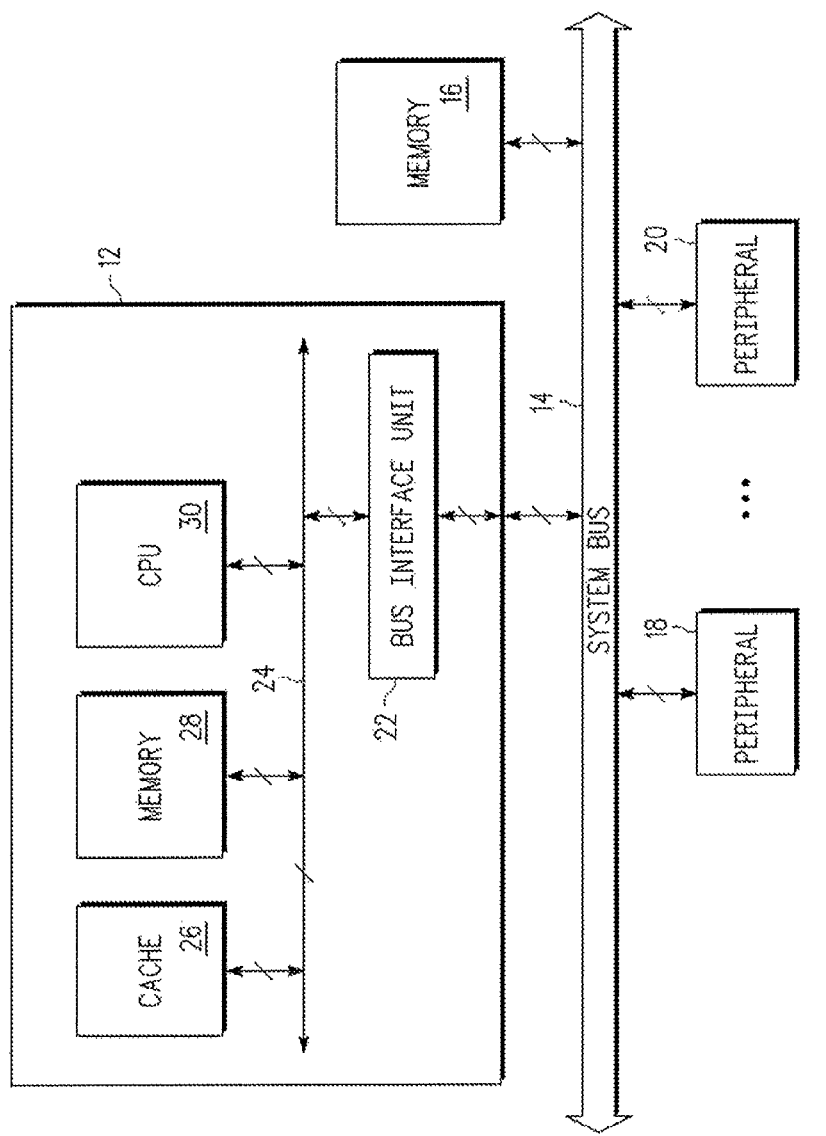
FIG. 1 illustrates in block diagram form a data processing system in accordance with one embodiment of the present invention.

In one embodiment, a memory is capable of operating in either parity or ECC mode. In one embodiment, in ECC mode, a partial write (i.e. a write to less than all banks in the memory) is performed with multiple accesses, including both a read access and a write access (for performing a read-modify-write). Also, in accordance with one embodiment, for a partial write in ECC mode, only those banks that are not being written to with the partial write are read for the read access portion of the read-modify-write operation. While correctness of the check bits and the generation of the syndrome bits cannot be guaranteed correct in this embodiment, there may be situations where this may be allowed, manageable, or even desired. However, in one embodiment, a full write (i.e. a write to all the banks in the memory) in ECC mode can be performed with one access, i.e. a single access. That is, the full write can be performed with a single write access without the need for a read access prior to the write access (i.e. without the need of a read-modify-write operation). In this manner, memories may operate more efficiently when in ECC mode than was previously available.

Also, in one embodiment, due to the ability of a memory to operate in either an ECC mode or a non-ECC mode, a processor pipeline may also be configured differently when operating in ECC mode versus a non-ECC mode. For example, in ECC mode, execution of single cycle instructions can be moved from one execution stage of the processor pipeline to another stage of the processor pipeline, or the sending of write data for a store instruction may be moved from one execution stage to another.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, a plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

FIG. 1 illustrates, in block diagram form, a data processing system 10 in accordance with one embodiment of the present invention. Data processing system 10 includes a processor 12, a system bus 14, a memory 16 and a plurality of peripherals such as a peripheral 18, a peripheral 20 and, in some embodiments, additional peripherals as indicated by the dots in FIG. 1 separating peripheral 18 from peripheral 20. The memory 16 is a system memory that is coupled to the system bus 14 by a bidirectional conductor that, in one form, has multiple conductors. In the illustrated form each of peripherals 18 and 20 is coupled to the system bus 14 by bidirectional multiple conductors as is the processor 12. The processor 12 includes a bus interface unit 22 that is coupled to the system bus 14 via a bidirectional bus having multiple conductors. The bus interface unit 22 is coupled to an internal bus 24 via bidirectional conductors. The internal bus 24 is a multiple-conductor communication bus. Coupled to the internal bus 24 via respective bidirectional conductors is a cache 26, a memory 28, and a central processing unit (CPU) 30. CPU 30 implements data processing operations. Each of cache 26, memory 28, and CPU 30 are coupled to the internal bus via respective bidirectional conductors. Note that memory 28 and memory 16 can be any type of memory, and peripherals 18 and 20 can each be any type of peripheral or device. In one embodiment, all of data processing system 10 is on a single integrated circuit. Alternatively, data processing system 10 can be implemented using more than one integrated circuit. In one embodiment, at least all of processor 12 is on a single integrated circuit.

In operation, the processor 12 functions to implement a variety of data processing functions by executing a plurality of data processing instructions. Cache 26 is a temporary data store for frequently-used information that is needed by CPU 30. Information needed by CPU 30 that is not within cache 26 is stored in memory 28 or memory 16. In one embodiment, memory 28 may be referred to as an internal memory where it is internal to processor 12 while memory 16 may be referred to as an external memory where it is external to processor 12. Bus interface unit 22 is only one of several interface units between processor 12 and system bus 14. Bus interface unit 22 functions to coordinate the flow of information related to instruction execution by CPU 30. Control information and data resulting from the execution of instructions are exchanged between CPU 30 and system bus 14 via bus interface unit 22.

Figure 2:
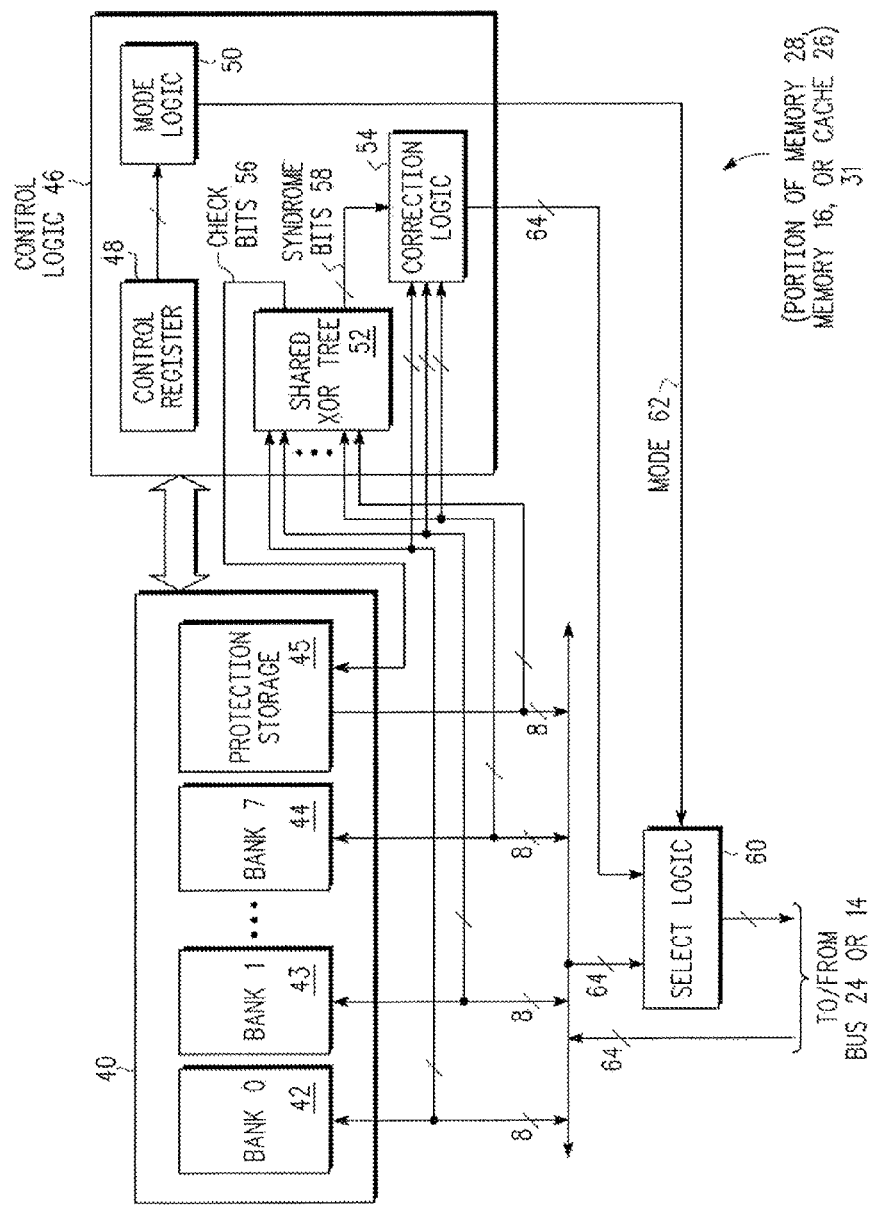
FIG. 2 illustrates in block diagram form a portion of a memory 31 useable within the data processing system of FIG. 1 in accordance with one embodiment of the present invention.

FIG. 2 illustrates a memory 31 useable within system 10 in accordance with one embodiment of the present invention. Memory 31 may represent a portion of memory 28, memory 16, or cache 26 of FIG. 1. Memory 31 includes memory storage circuitry 40 which includes a number of memory banks and protection storage 45. In the illustrated embodiment, memory storage circuitry 40 includes 8 banks: bank 0 42, bank 1 43, . . . , bank 7 44. Alternate embodiments may include any number of banks.

Memory 31 also includes control logic 46 and select logic 60. Select logic is coupled to both memory storage circuitry 40 and control logic 46. Control logic 46 is bidirectionally coupled to memory storage circuitry 40 and includes a control register 48, mode logic 50, a shared exclusive-OR (XOR) tree 52, and correction logic 54. Control register 48 is coupled to mode logic 50, which, based on the value of one or more control bits within control register 48, outputs a mode indicator 62 to a control input of select logic 60. In one embodiment, mode 62 indicates what error detection mode memory 31 is operating in. For example, in the illustrated embodiment, based on a value stored in control register 48, mode 62 indicates whether memory 31 is operating in ECC mode or parity mode. In one embodiment, a single bit within control register 48 indicates whether memory 31 is operating in ECC mode or parity mode. Alternatively, multiple bits may be used to indicate ECC or parity mode.

In ECC mode, each entry of protection storage 45 stores corresponding check bits for the corresponding entry within banks 0-7. For example, the first entry of protection storage 45 stores the check bits corresponding to the data stored in the first entry of each of banks 0-7. In parity mode, though, each entry of protection storage 45 stores a parity bit corresponding to an entry in each of banks 0-7. For example, in parity mode, the first entry of protection storage 45 stores a parity bit for the first entry in each of banks 0-7, Therefore, in the illustrated embodiment in which there are 8 banks, each entry of protection storage 45 stores 8 bits of parity, one for each of banks 0-7.

In ECC mode, shared XOR tree 52 is coupled to receive information from each of bank 0 through bank 7 and from protection storage 45. In ECC mode, shared XOR tree 52, based on information received from either bus 24 or 14, or from a particular entry in each of banks 0-7, or a combination of both, generates check bits 56 which are provided to protection storage 45 for storage in a corresponding entry. Also, in ECC mode, shared XOR tree 52, based on information received from a particular entry in each of banks 0-7 and corresponding check bits from protection storage 45, generates syndrome bits 58 which are provided to correction logic 54. In ECC mode, correction logic 54 also receives the information from the particular entry in each of banks 0-7 and uses the corresponding syndrome bits 58 to correct the received information and provide the corrected information from the particular entry of banks 0-7 to select logic 60. Therefore, select logic 60, based on the value of mode 62, either provides the output of correction logic 54 to bus 24 or 14 (if in ECC mode) or the output of one or more of banks 0-7 directly to bus 24 or 14 (if in parity mode). Note that in parity mode, the corresponding parity bits may also be provided to bus 24 or 14 from protection storage 45.

Therefore, for a read operation in parity mode, select logic 60 provides the output of the accessed entry in one or more of banks 0-7, as well as the corresponding parity bits, to bus 24 or 14. For a read operation in ECC mode, select logic 60 provides the output of correction logic 54 to bus 24 or 14. For a write operation in parity mode, the write data is provided directly to an entry in one or more of banks 0-7 which is addressed by the write operation access address. That is, a write may be performed to any number of banks in banks 0-7, and the corresponding parity bits in the corresponding entry of protection storage 45 also get updated on a per-bit basis after generation in shared XOR tree 52. In this manner, if only one bank is written to as a result of the write operation, then only one bit in the corresponding entry of protection storage 45 is updated. The updating of parity bits in parity mode may be performed by logic within control logic 46 (not shown) in a known manner.

For a full write operation in ECC mode, in which all of banks 0-7 are written to, a read-modify-write (RMW) operation need not be performed, In this manner, a full write operation (a write to all banks of memory 31) can be performed with one or a single access (e.g. in a single processor cycle or a single clock cycle). In this case, the write data is provided to each entry of banks 0-7 addressed by the full write operation access address. The write data is also provided to shared XOR tree 52 which generates the corresponding check bits and provides them via check bits 56 to protection storage 45 for storage in the corresponding entry. In one embodiment, shared XOR tree 52 is combinational logic where the generation and write back of the check bits can be completed in the same processor or clock cycle as the write of the write data to banks 0-7.

For a partial write operation in ECC mode, in which less than all of banks 0-7 is written to, a read-modify-write (RMW) is performed. Therefore, performing a write operation to less than all of banks 0-7 requires multiple accesses (e.g. multiple processor cycles or clock cycles), and cannot be performed with a single access as is the case for a full write operation. In one embodiment, when doing a partial write in ECC mode, then only the data from the banks not being accessed (i.e. not being written to) is provided to shared XOR tree 52. The write data that is to be written to the accessed bank is also provided to shared XOR tree 52. Therefore, shared XOR tree 52 generates the corresponding check bits for the new entry (the one which includes the new write data), and provides these check bits via check bits 56 for storage in the corresponding entry of protection storage 45. Note that in this embodiment, there is no guarantee of the correctness of the data read from the other banks (the ones not being written to) which was used to form the check bits. That is, the read data is not first checked for errors and corrected prior to being used for generating new check bits using the new write data. For example, if data is being written into bank 1, then the read data from banks 0 and 2-7 is used in combination with the write data to be written to bank 1 to generate the new check bits to be stored back to a corresponding entry of protection storage 45. In the embodiment of FIG. 2, though, the read data from banks 0 and 2-7 is not first checked for errors and corrected prior to generating the check bits, thus correctness of the data bits cannot be guaranteed.

However, in some embodiments, it may not matter that the read data are not guaranteed correct. For example, this may be the case when a tally of ECC errors is being accumulated to determine how much memory operating margin is left. In this case, logic within control logic 46 or elsewhere within system 10 may be performing this tally to determine operating margin. Alternatively, correctness may not matter in the case where data within banks 0-7 is first being initialized since what may be currently stored in all or portions of banks 0-7 is meaningless data (i.e. junk data) or data that is known to have errors. Correctness also may not matter during an initialization period of memory 31. Therefore, there may be many different instances in which correction need not be guaranteed initially, but proper parity check information can be written in order for later accesses to be able to provide correctable data.

Figure 3:
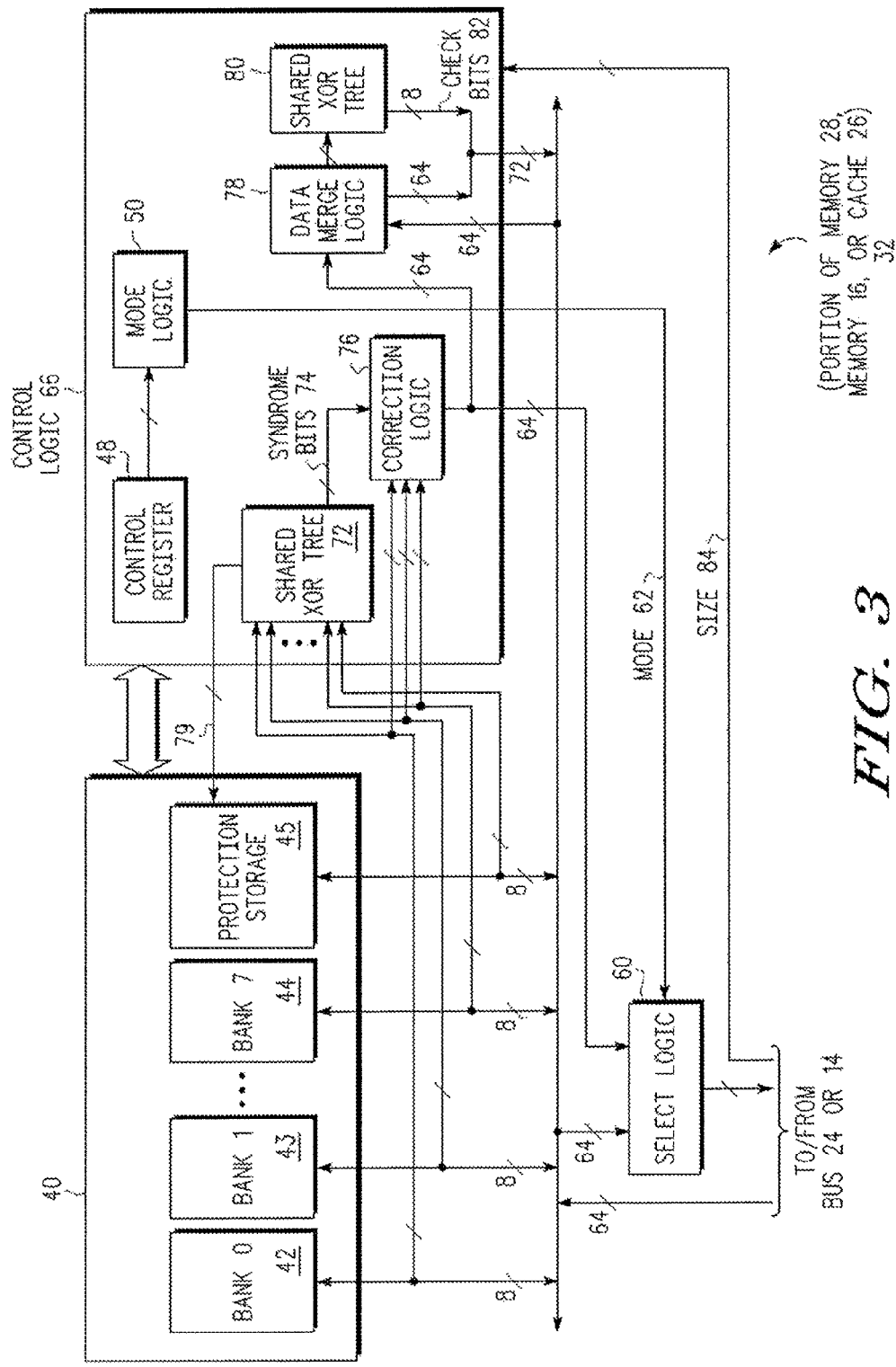
FIG. 3 illustrates in block diagram form a portion of a memory 32 useable within the data processing system of FIG. 1 in accordance with one embodiment of the present invention.

However, there are also many instances in which correction of the read data should be performed during the read cycle of the RMW operation (i.e. during the read cycle of the write operation) in order to generate and store correct check bits, which are then used to generate correct syndrome bits for error correction. FIG. 3 illustrates a portion of a memory 32 useable within system 10 in accordance with another embodiment of the present invention. Memory 32 may represent a portion of memory 28, memory 16, or cache 26 of FIG. 1. Note that memory 32 shares many similar elements with memory 31 of FIG. 2 in which like elements are referenced with like numbers. The description for many of the elements of memory 31 provided above also apply to the like elements of memory 32 of FIG. 3. Therefore, the full operation and connectivity of FIG. 3 will not be described.

Control logic 66, in addition to control register 48 and mode logic 50, also includes a shared XOR tree 72, correction logic 76, data merge logic 78, and shared XOR tree 80. Shared XOR tree 72 and correction logic 76 operate similar to shared XOR tree 52 and correction logic 54. However, rather than shared XOR tree 72 generating the check bits for storage back into protection storage 45, the read data for a partial write is first corrected by correction logic 76 and then merged with the new write data by data merge logic 78. It is then this combination of the new write data with the correct read data (which was corrected, if necessary, by correction logic 76) that is used by shared XOR tree 80 to generate correct check bits 82. In one embodiment, the write data, merged with the corrected read data, along with check bits 82, are then provided back to memory storage circuitry 40 for storage into the corresponding entries of banks 0-7 and protection storage 45, respectively. Note that in order to generate appropriate syndrome bits 74 to correct the read data of those banks not being written to for the partial write operation, data from each of banks 0-7 has to be provided to shared XOR tree 72. For example, even if a partial write operation to only bank 1 is being performed, the read data from the accessed entry in each of banks 0-7 is provided to shared XOR tree 72 to generate the correct syndrome bits 74 to correct the read data from banks 0 and 2-7. Data merge logic 78 then merges the corrected read data from banks 0 and 2-7 with the write data that is to be written to bank 1 and provides this merged data to banks 0-7 as well as to shared XOR tree 80. In ECC mode, shared XOR tree 80 generates the proper check bits 82 which are provided to the entry of protection storage 45 corresponding to the write operation access address. In one embodiment, only the bytes being written to, along with the check bits, are updated during the write operation, and the other banks are not accessed, in order to save power, even though data merge logic provides additional data on partial writes.

In one embodiment, correction logic 76 also provides correction indicators corresponding to read data bytes which required correction during the read portion of the read-modify-write (RMW) operation to control logic 66. When the RMW write is performed, these indicators are used to also update those read data bytes which contained erroneous data on the previous read, thus allowing for transient errors to be corrected in the memory array in such cases. By performing this update, accumulation of multiple errors over time may be minimized, since any write cycle of any size to the memory entry will correct any stored error(s). Since errors may be, in some embodiment, assumed to be rare, the additional power associated with the additionally updated banks can be minimal.

In parity mode, shared XOR tree 72 generates the proper parity bits 79 which are provided to the entry of protection storage 45 corresponding to the write operation access address. Note that in parity mode, the corresponding parity bits may also be provided to bus 24 or 14 from protection storage 45.

The remainder of memory 32 operates as was described above in reference to memory 31. Also, note that for a full write in ECC mode in which all of banks 0-7 are written to, a read access does not first need to be performed during the write operation (i.e. a RMW need not be performed). That is, the write operation can be performed in a single access (i.e. with only one write access and no read access). For a full write, the write data is provided, from bus 24 or 14, to each of banks 0-7 as well as to shared XOR tree 80 (via data merge logic 78) for generation of the check bits which are provided to protection storage 45. Therefore, only a single access is needed (i.e. no read access is needed) to perform a full write. In parity mode, no read access is performed, regardless of the write being a partial write or a full write. Each byte of data along with the corresponding byte parity bit is written into the corresponding bank 0-7 of memory 40 and parity bit within protection storage 45 corresponding to the byte.

Figure 4:
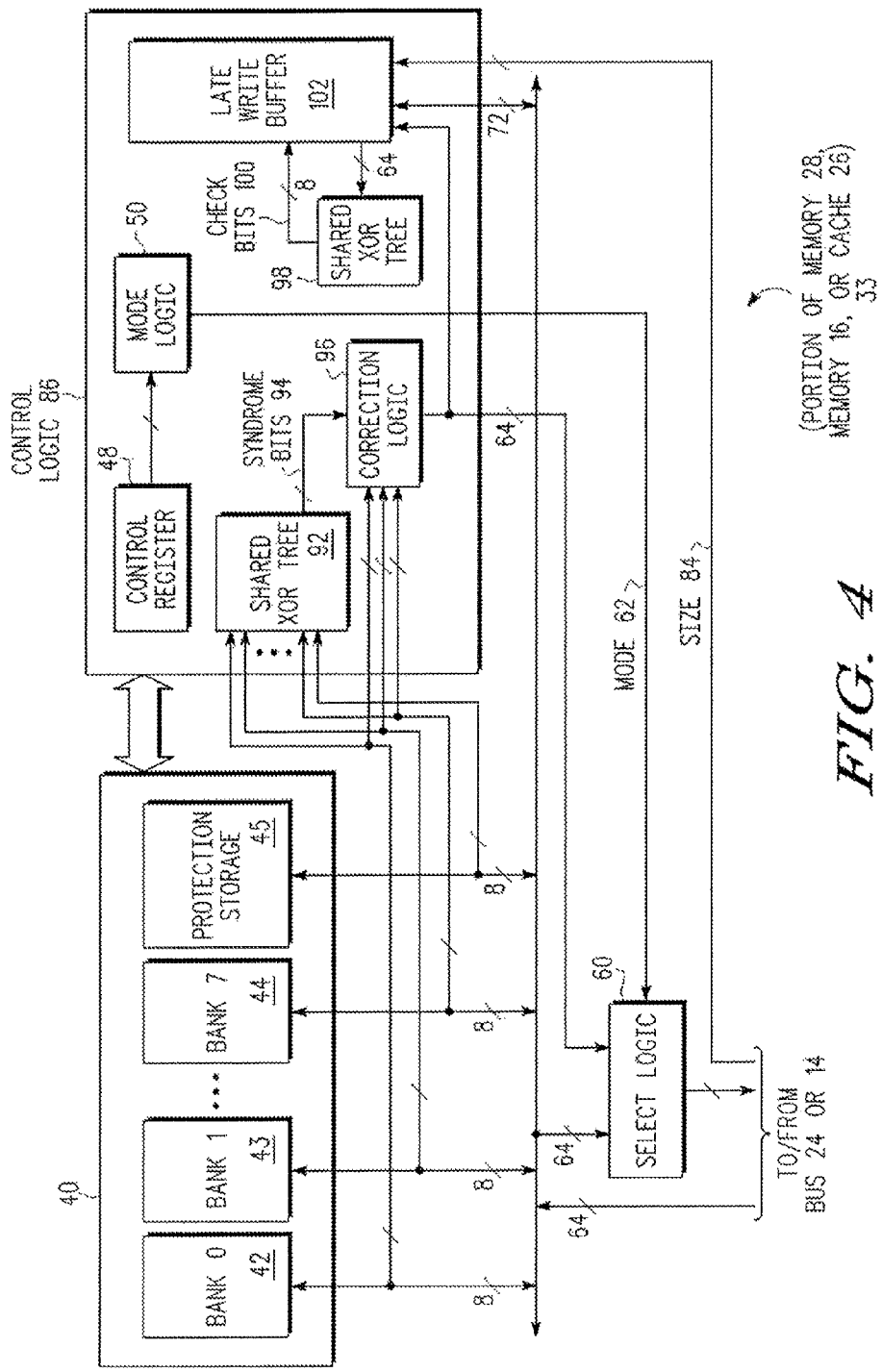
FIG. 4 illustrates in block diagram form a portion of a memory 33 having a late write buffer and useable within the data processing system of FIG. 1 in accordance with one embodiment of the present invention.

FIG. 4 illustrates a portion of a memory 33 useable within system 10 in accordance with another embodiment of the present invention. Memory 33 may represent a portion of memory 28, memory 16, or cache 26 of FIG. 1. Note that memory 33 shares many similar elements with memory 31 of FIG. 2 and memory 32 of FIG. 3 in which like elements are referenced with like numbers. The description for many of the elements of memories 31 and 32 provided above also apply to the like elements of memory 33 of FIG. 4. Therefore, the full operation and connectivity of FIG. 4 will not be described.

As with memory 32 of FIG. 3, memory 33 of FIG. 4 also provides for the correction of read data for a partial write operation in order to ensure correctness. However, rather than providing the write data and check bits directly back to banks 0-7 and protection storage 45, respectively, as was done by data merge logic 78 and shared XOR tree 80 in FIG. 3, the check bits and write data are written to a late write buffer 102. The check bits and write data will be written from late write buffer 102 to memory storage circuitry 40 at a later point in time rather than in the current cycle. In an alternate embodiment, note that late write buffer 102 may located anywhere within memory 33 or within system 12.

Control logic 86, in addition to control register 48 and mode logic 50, also includes a shared XOR tree 92, correction logic 96, shared XOR tree 98, and a late write buffer 102. Shared XOR tree 92 and correction logic 96 operate similar to shared XOR tree 52 and correction logic 54. However, rather than shared XOR tree 92 generating the check bits for storage back into protection storage 45, the read data for a partial write is first corrected by correction logic 96 and then provided, along with the new partial write data, to a data field of late write buffer 102. Therefore, the data field of late write buffer 102 stores the combination of the new write data with the correct read data (which was corrected, if necessary, by correction logic 96) that is used by shared XOR tree 98 to generate correct check bits 100. Check bits 100 are also provided to late write buffer 102, for storage in a check bits portion of the buffer. Note that a size indicator 84 is also provided to late write buffer 102 from bus 24 or 14 such that size information regarding the size of the data to be written for the partial write operation can also be stored into late write buffer 102. In this manner, when the data in late write buffer 102 is to be stored to memory storage circuitry 40, the appropriate size of the write data to one or more of banks 0-7 is known, and the appropriate check bits can be stored in the corresponding entry of protection storage 45. As with memory 32 of FIG. 3, note that in order to generate appropriate syndrome bits 94 to correct the read data of those banks not being written to for the partial write operation, data from each of all banks 0-7 has to be provided to shared XOR tree 92. In one embodiment, correction logic 96 also provides correction indicators corresponding to read data bytes which required correction to late write buffer 102. When the write is later performed, these indicators are used to also update those read data bytes which contained erroneous data on the previous read, thus allowing for transient errors to be corrected in the memory array in such cases. By performing this update, accumulation of multiple errors over time may be minimized, since any write cycle of any size to the memory entry will correct any stored error(s).

The remainder of memory 33 operates as was described above in reference to memory 31 or 32. Also, note that for a full write in which all of banks 0-7 are written to, a read access does not first need to be performed during the write operation (i.e. a RMW need not be performed). That is, the write operation can be performed in a single access (i.e. with only one write access and no read access). For a full write, the write data is provided, from bus 24 or 14, to the write data portion of late write buffer 102 as well as to shared XOR tree 98 for generation of check bits 100 which are also provided to late write buffer 102. Therefore, only a single access is needed (i.e. no read access is needed) to perform a full write, when the write is later performed.

FIG. 5 shows one embodiment of late write buffer 102 which includes an address field, a data field, a check bits field, a size field, and a valid field. As described above, the data field may store the received write data or the received write data merged with the corrected read data from the other banks. The address field may store the write access address of the write operation and thus indicates which entry in banks 0-7 and protection storage 45 is to be written to. The size field may store size information of the write data, and the valid field may be used to indicate whether current values stored within late write buffer 102 is valid or not. Note that in one embodiment, the valid field may include multiple bits corresponding to the respective bytes of the data field to be written to memory storage circuitry 40. In this embodiment, when the write is performed, only those banks of memory storage circuitry corresponding to a set valid bit will be accessed, thus saving power. However, in one embodiment, protection storage circuitry 45 will always be updated. Note that late write buffer 102 may operate in a variety of known ways. For example, the use and timing of late write buffer 102, such as when the contents of late write buffer 102 get written back to memory storage circuitry 40, may be as known in the art.

Note that in some embodiments, there may be periods of times or applications in which correctness need not be guaranteed and other times when it should. Therefore, in one embodiment, the capability of both the control logic of FIG. 2 and the control logic of FIG. 3 or 4 may be present within memory 28, memory 16, or cache 26. For example, during an initialization period (such as when the data stored in memory storage circuitry 40 is known to have a lot of errors), the more simplistic capability of control logic 46 may be sufficient, whereas after the initialization period, the more complete capability of control logic 66 or 86 may be needed. Therefore, additional circuitry may be present within memory 28, memory 16, or cache 26 to allow for both of the functionalities to be present and used when needed. Selection of such operation may be made by the user of system 10 in a variety of ways, such as by a setting of a configuration register within system 10, such as control register 48. In one embodiment, control register 48 may be modified by software executed by a user of system 10, or may be configured in other ways.

In one embodiment, processor 12 may operate in a pipelined manner. For example, processor 12 may include a processor pipeline which includes stages for instruction fetch, instruction decode, register read, execution, and result writeback. Certain stages may involve multiple clock cycles of execution. In one embodiment, some or all of the circuitry to implement the processor pipeline is located within CPU 30 of processor 12. Note that this circuitry is known to one of ordinary skill in the art, and only modifications to that circuitry will be discussed herein. In one embodiment, processor 12 (e.g. CPU 30) includes a plurality of pipeline stages, feedforward logic, and feedforward control circuitry. In one embodiment, processor 12 also includes an instruction prefetch buffer, as known in the art, to allow buffering of instructions prior to the decode stage. Instructions may proceed from this prefetch buffer to the instruction decode stage by entering the instruction decode register (IR).

FIG. 6 illustrates, in table form, pipeline stages of processor 12 (e.g. of CPU 30) in accordance with one embodiment of the present invention. The stages include: an instruction fetch from memory, stage 0, which can be abbreviated as IF0; an instruction fetch from memory, stage 1, which can be abbreviated as IF1; an instruction decode/register read/operand forwarding/memory effective address generation, which can be abbreviated as DEC/RF READ/EA (or as any one of these, depending on which function is being performed by that stage in a particular example); an instruction execution stage 0/memory access stage 0, which can be abbreviated as E0/M0 (or as only one of these, depending on whether an instruction execution stage is occurring or a memory access is occurring for a particular example); an instruction execution stage 1/memory access stage 1, which can be abbreviated as E1/M1 (or as only one of these, depending on whether an instruction execution stage is occurring or a memory access is occurring for a particular example); and a write back to registers, which can be abbreviated as WB. Therefore, note that the illustrated embodiment includes 6 stages. Alternatively, the processor pipeline may include more or less stages. For example, a processor pipeline may include only a single instruction fetch from memory stage rather than having both IF0 and IF1. Also, note that multiple abbreviations may be used to refer to the same pipeline stage. For example, if an effective address is being calculated for a particular instruction, then the DEC/RF READ/EA stage may simply be referred to as the EA stage or the DEC/EA stage. Similarly, if an instruction not requiring a memory access (e.g. an arithmetic instruction) is being executed, each of E0/M0 and E1/M1 may be referred to as stages E0 and E1, respectively. If an instruction requiring a memory access (e.g. load/store instructions) is being executed, each of E0/M0 and E1/M1 may be referred to as stages M0 and M1, respectively.

Still referring to the example pipeline of FIG. 6, stages IF0 and IF1 retrieve instructions from the memory system (e.g. from memory 28, cache 26, or memory 16) and determine where the next instruction fetch is performed (e.g. generates instruction fetch addresses). In one embodiment, up to two 32-bit instructions or four 16-bit instructions are sent from memory to the instruction buffers each cycle. Note that cycle, as used herein, may refer to a processor clock cycle and may therefore also be referred to as a clock cycle or processor cycle. The decode pipeline stage (DEC/RF READ/EA) decodes instructions, reads operands from the register file, and performs dependency checking, as well as calculating effective addresses for load and store instructions. Therefore, depending on the type of instruction present in the decode pipeline stage, different functions may be performed during the decode pipeline stage.

Instruction execution occurs in one or more of the execute pipeline stages in each execution unit (where this may occur over multiple cycles). For example, execution of most load/store instructions is pipelined. In one embodiment, the load/store unit has three pipelines stages, including the effective address calculation (DEC/RF READ/EA, or simply referred to as EA), M0, and M1. In one embodiment, as will be described below, M1 is used when performing ECC (i.e. when in ECC mode).

Simple integer instructions normally complete execution in the E0 stage of the pipeline. Multiply instructions may require both execute stages, E0 and E1, but may be pipelined as well. Most condition-setting instructions complete in the E0 stage, thus conditional branches dependent on a condition-setting instruction may be resolved in this E0 stage. Note that an instruction, whether a simple instruction using only one pipeline execution stage or an instruction requiring more than one pipeline execution stage, may be described as causing a data processor (e.g. processor 12) to perform a set of computational operations during execution of the instruction. In the case of a simple instruction, the set of computational operations may be performed in either E0 or E1 (depending, for example, on whether processor 12 is operating in ECC or parity mode, as will be described below). In the case of an instruction requiring more than one pipeline execution stage, the set of computational operations may be performed using both E0 and E1.

In one embodiment, result feed-forward hardware (as known in the art) forwards the result of one instruction into the source operand or operands of a following instruction so that the execution of data-dependent instructions do not wait until the completion of the result writeback in the WB stage. Feed forward hardware may also be supplied to allow bypassing of completed instructions from all three execute stages (DEC, E0, and E1) into the first execution stage for a subsequent data-dependent instruction. When an instruction completes early in the pipeline, such as in the E0 or M0 stage, the results of the instruction flow though the subsequent stages of the pipeline, but no further computation is performed. These stages are referred to as feedforward stages (shown as FF in the pipeline flow diagrams), and the results may be provided as inputs to subsequent instructions in the pipeline.

In one embodiment, when parity protection is used for data memory (i.e. when a memory is operating in parity mode), load and store accesses use only the EA and M0 stages of the pipeline, and the load data is available at the end of M0 for use by a subsequent instruction. There is no stall if the instruction following the load uses the load data accessed by the load, unless it is used for an immediately subsequent EA calculation in the EA stage.

In one embodiment, when ECC is utilized for the data memory (i.e. when a memory is operating in ECC mode), data memory accesses require both memory stages. Also, in ECC mode, the execution of simple integer instructions is moved to the E1 stage. That is, rather than the execution of simple integer instructions being performed in E0, as was described above, they are performed in E1. By doing so, there is still no stall normally required, even though the memory access with ECC requires an additional cycle for performing error check and correction. There is no stall required because the simple integer instructions are single cycle instructions which may be completed in a single execution stage. Although moving the integer instruction execution to the E1 stage delays comparison results and condition codes used by conditional branch instructions in the DEC stage and this may delay branch decision outcomes, a net performance benefit may still be achieved, such as when branch prediction hardware (as known in the art) is employed, since the branch target address can be predicted and fetched ahead of the condition code setting.

FIGS. 7-17 illustrate various examples of pipeline flows for different types of instructions and in different modes of operation (such as in parity or ECC mode). For each example, note that a time axis is provided, where each slot on the time axis refers to a time slot, where this time slot may correspond, for example, to a clock cycle. The pipeline flows indicate when, with respect to time, each instruction (listed down the left side of the flows) is in a particular stage of the pipeline. For example, as seen in FIG. 7, the first instruction enters IF1 in the first time slot (i.e. during the first clock cycle) illustrated in FIG. 7. In the second time slot (i.e. during the second clock cycle), the first instruction moves from the IF0 stage to the IF1 stage, and the second instruction enters the IF0 stage. In the third time slot (i.e. during the third clock cycle), the first instruction moves from the IF1 stage to the DEC stage, the second instruction moves from the IF0 stage to the IF1 stage, and the third instruction moves into the IF0 stage. This description of how the pipeline flows are drawn applies to each of FIGS. 7-17.

FIG. 7 illustrates an example of a pipeline flow of single cycle instructions when operating in parity mode. In this example, single-cycle instructions are issued and completed in program order. Most arithmetic and logic instructions fall into this category of single-cycle instructions. This example shows the result of the first instruction being fed-forward into one of the operands of the second instruction. As indicated by arrow 200 in FIG. 7 from E0 of the first row to E0 of the second row, the results of the first instruction (which are determined in stage E0) are forwarded by feed-forwarding hardware to the E0 stage of the second instruction such that the second instruction can use this result of the first instruction during its execution, without having to wait for the results of the first instruction to be written back in the WB stage, which would result in a number of pipeline stalls. Note that in this example, with feed-forwarding, no pipeline stalls are needed. Also note that in the example, the E0 stage is followed by a FF stage, which is the unused E1 stage for these instructions. In the FF stage, operands may also be forwarded, such as from the first instruction to the E0 stage of the third instruction.

Figure 8:
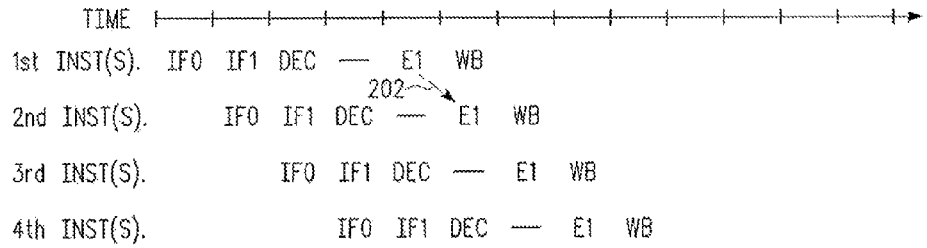

FIG. 8 illustrates an example of a pipeline flow of single cycle instructions when operating in ECC mode. In this example, sequences of single-cycle instructions are issued and completed in program order. Most arithmetic and logic instructions fall into this category of single-cycle instructions. In this example, the E0 stage is a simple passthrough stage (as indicated by the "—" in FIG. 8 between the DEC and E1 stages), used to delay available input values which come from the register file until the E1 stage. The example of FIG. 8 shows the result of the first instruction being fed-forward into one of the operands of the second instruction (as indicated by arrow 202 in FIG. 8 from E1 of the first row to E1 of the second row). In this manner, the second instruction, as with the example of FIG. 7, can use the results of the first instruction without having to wait for the results of the first instruction to be written back in the WB stage, which would result in a number of pipelines stalls. Note that in this example, with feed-forwarding, no pipeline stalls are needed.

Figure 9:
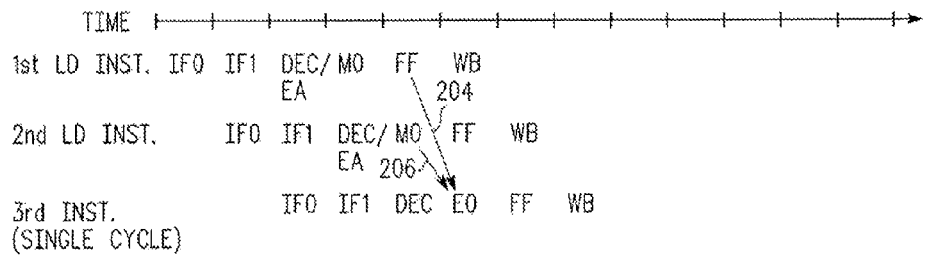

FIG. 9 illustrates an example of a pipeline flow of two load instructions followed by a single cycle instruction when operating in parity mode. In parity mode, for load instructions, the effective address is calculated in the DEC/EA stage, and memory (e.g. memory 28 or memory 16 or cache 26) is accessed in the M0 stage. Data selection and alignment may be performed in M0, and the result is available at the end of the M0 stage for the following instruction. In this example, the M1 stage is simply a feedforward stage, as indicated by the FFs in FIG. 9, which is used to hold the load data until it reaches the WB stage. For example, for the first load instruction, the load data is held in M1 (labeled as FF in FIG. 9) until the first load instruction enters the WB stage of the pipeline in the next time slot. If the following instruction does not use the data for an effective address calculation or a multiply instruction, no stalls occur. In the illustrated embodiment of FIG. 9, the first load instruction in the sequence of load instructions feeds one of the source operands of the third instruction and the second load instruction in the sequence of load instructions feeds a second source operand of the third instruction. That is, as indicated by arrow 204, the load data of the first load instruction is feed-forwarded to the E0 stage of the third instruction, and, as indicated by arrow 206, the load data of the second load instruction is also feed-forwarded to the E0 stage of the third instruction. In this example, the third instruction is a single-cycle instruction, such as, for example, an arithmetic or logic instruction, which uses two source operands. Due to these feed-forward paths no stalls are incurred because the third instruction needs not wait for the first and second instructions to enter the WB stage.

Figure 10:
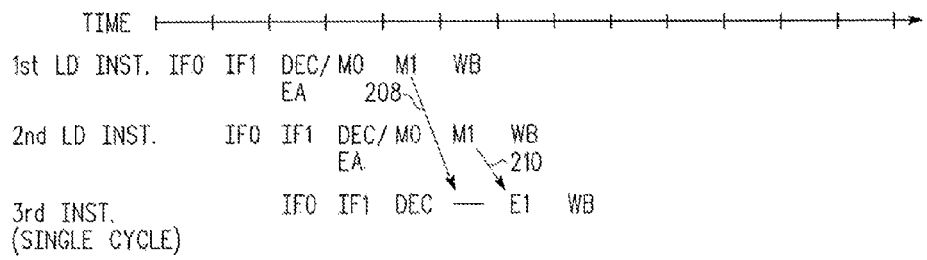
Figure 19:
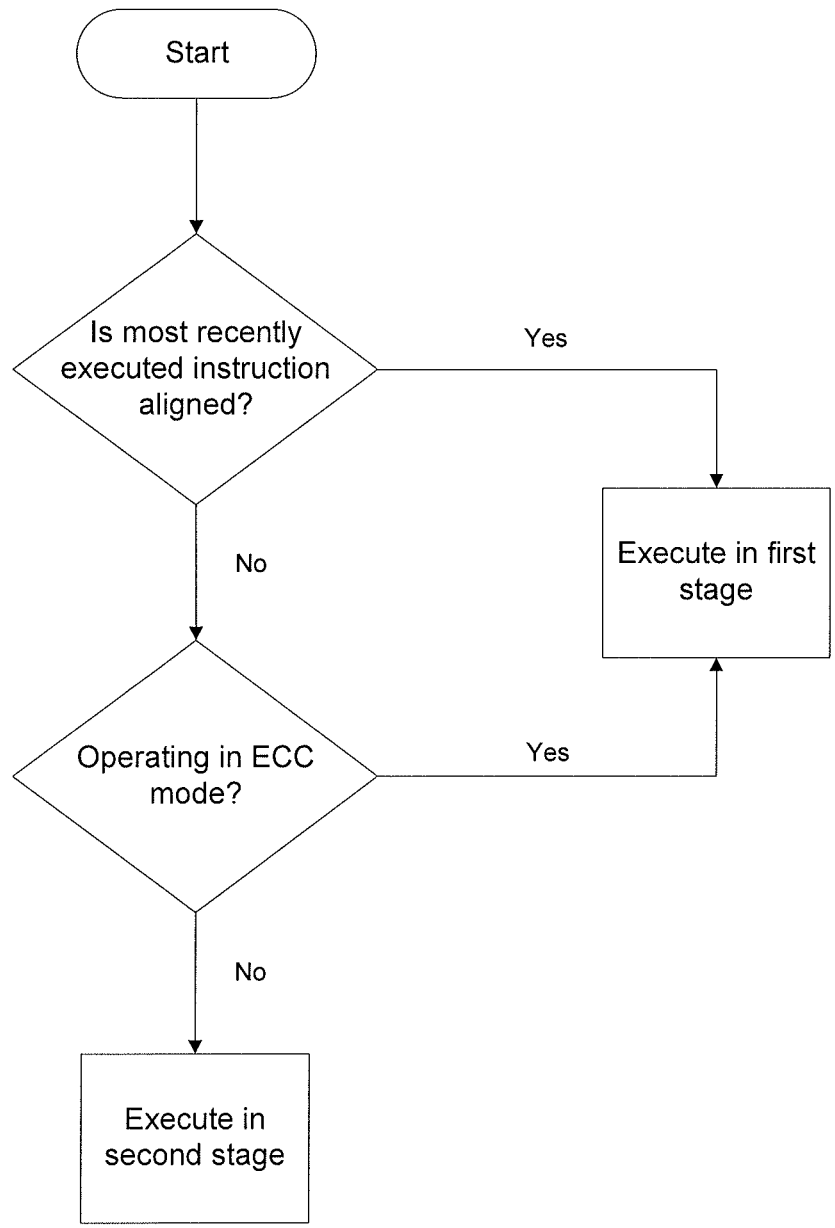
FIG. 19 illustrates in flow diagram form a method of executing a data-dependent instruction in a first or a second instruction pipeline stage in accordance with one embodiment of the present invention.

FIG. 10 illustrates an example of a pipeline flow of two load instructions followed by a single cycle instruction when operating in ECC mode. In ECC mode, for load instructions, the effective address is calculated in the DEC/EA stage, and memory (e.g. memory 28 or memory 16 or cache 26) is accessed in the M0 and M1 stages. For example, data is accessed in the M0 stage, and error checking, correction, and alignment is performed in the M1 stage, and the result is then available at the end of the M1 stage for the following instruction. If the following instruction does not use the data for an EA calculation or a multiply instruction, no stall occurs. In the example of FIG. 10, the second load instruction feeds one of the source operands of the third instruction (as shown by arrow 210 in FIG. 10). The other source operand of the third instruction is fed forward from the first load instruction to the E0 stage which, in the illustrated embodiment, is a delay stage (as indicated by the "—" in FIG. 10), where it then propagates to the E1 stage on the next cycle. Since the feedforward paths are provided, no stalls are incurred. In the illustrated embodiment, the third instruction is a single-cycle instruction, such as, for example, an arithmetic or logic instruction, which uses two source operands. Therefore, although the third instruction goes through a delay stage and does not execute until E1 (rather than executing in E0), no stalls occur since there are two execution stages available (E0 and E1) and a single-cycle instruction only needs one execution stage to execute. As shown in FIG. 19, the determination of whether the third instruction executes in E0 or E1 may be based on a variety of factors, such as operating mode and whether the previous instruction was aligned. In one embodiment, execution of a single-cycle instruction, such as the third instruction, occurs in E0 rather than E1, such as when not operating in ECC mode. In one embodiment, when ECC mode is not enabled, the execution of a single cycle instruction occurs in E0, but when ECC mode is enabled, the execution of the single cycle instruction is moved from E0 (where E0 simply becomes a delay stage) to E1. Therefore, the execution of a single instruction may be moved between E0 and E1 based on an operating mode (such as based on whether ECC mode is enabled or not), as graphically exemplified by FIG. 19. In one embodiment, when ECC is not enabled, parity mode is enabled. Alternatively, when ECC is not enabled, parity mode may not be enabled, where no error detection is being performed or where yet another error detection scheme is enabled. Also note that in one embodiment, the execution of a single instruction may be moved between E0 and E1 based on whether a previous load is a misaligned load which requires two memory accesses to complete. In this embodiment, the execution of a single cycle instruction may be moved from E0 to E1 dynamically, even when ECC is not enabled, based on detecting that a previous load instruction is misaligned and requires both the M0 and M1 stages of the pipeline to complete the two memory accesses necessary to perform the misaligned access. This embodiment looks identical to FIG. 10, with the exception that ECC is not enabled.

FIG. 11 illustrates an example of a pipeline flow of two store instructions followed by a single cycle instruction when operating in parity mode. In parity mode, for store instructions, the effective address is calculated in the DEC/EA stage, and memory (e.g. memory 28, memory 16, or cache 26) is written in the M0 stage. The M1 stage is simply a feedforward stage which is unused (as indicated by the "(FF)" in place of the M1 stages in FIG. 11). Also, note that store instructions do not normally use the WB stage, either, as indicated by the parentheses around the WB stages in FIG. 11.

FIG. 12 illustrates an example of a pipeline flow of two store instructions followed by a single cycle instruction when operating in ECC mode. In ECC mode, for store instructions, the effective address is calculated in the DEC/EA stage, and memory (e.g. memory 28, memory 16, or cache 26) is access in the M0 and M1 stages. For example, data is read in the M0 stage, and error checking, correction, and data modification (e.g. for storing back corrected data), and updated syndrome generation is performed in M1. The updated value may then be sent, in M1, to a buffer, such as a late write buffer 102. This stored updated value may then be written to memory in M1 of the next store instruction. That is, during the M1 stage of a current store instruction, the store data from a previous store instruction is written to memory. In one embodiment, this store data from a previous store instruction is stored in a late write buffer, such as late write buffer 102, until it is written to memory. Therefore, referring to the example of FIG. 12, in stage M1 of the first store instruction, previous store data from a previous store instruction (not shown) would be written to memory, where this previous store data may be stored in a late write buffer, such as late write buffer 102, until it is written to memory. The current store data from the first store instruction of FIG. 12 may therefore, in M1, be sent to a late write buffer, such as late write buffer 102, for subsequent storage to memory. Similarly, in stage M1 of the second store instruction, the previous store data from the first store instruction of FIG. 12 (which was previously stored to a late write buffer) is written to memory. The current store data from the second store instruction of FIG. 12 may, in M1, be sent to a late write buffer, such as late write buffer 102, for subsequent storage to memory.

Note that in one embodiment, normally, the write data of a store instruction can be sent (e.g. to late write buffer 102) from the M0 stage of that store instruction rather than the M1 stage of the store instruction. However, in the illustrated embodiment, the write data is sent from the M1 stage of the store instruction (e.g. to late write buffer 102) to be written to memory in the M1 stage of a next store instruction. In one embodiment, when ECC mode is not enabled, the sending of the write data of a store instruction (e.g. to late write buffer 102) occurs in M0, but when ECC mode is enabled, the sending of the write data is moved from M0 to M1, since the memory may first be accessed by a read in order to provide data for the proper check bit generation for the store. Therefore, the sending of the write data of a store instruction may be moved between M0 and M1 based on an operating mode (such as based on whether ECC mode is enabled or not). Note that, in the illustrated embodiment, since ECC mode is enabled, execution of the third instruction (which is a single-cycle instruction) is moved from E0 to E1, as was described above, for example, in reference to FIG. 10.

Figure 13:
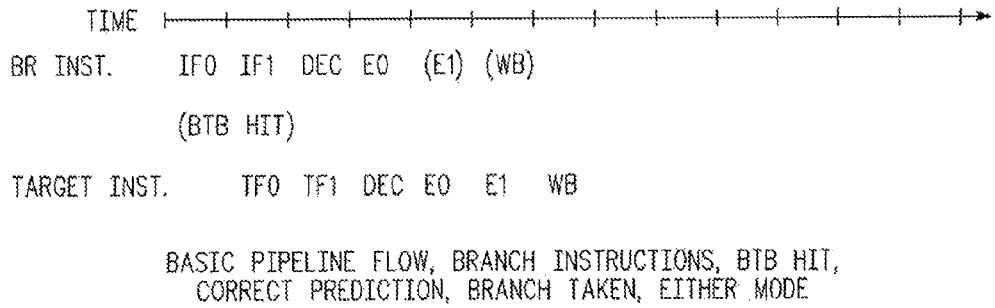
Figure 14:
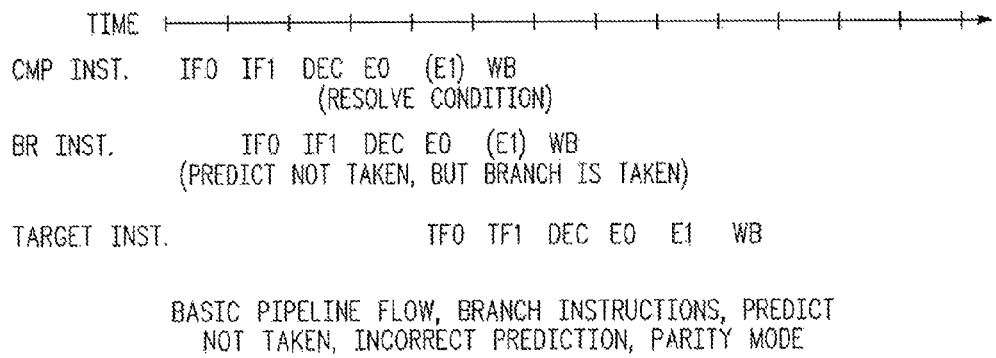
Figure 15:
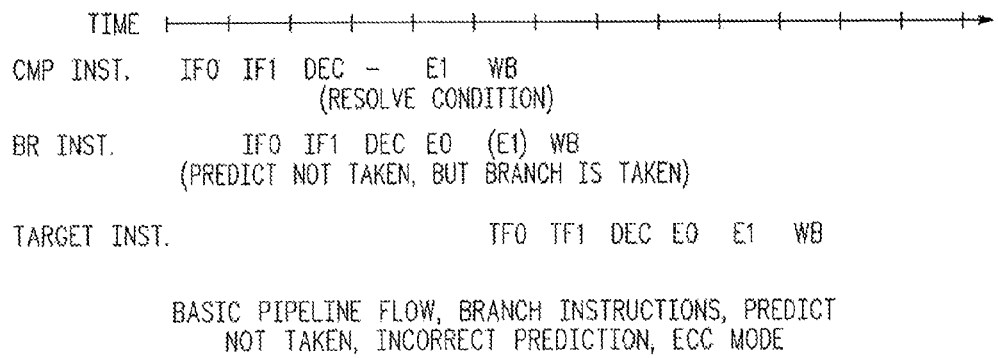

FIGS. 13-15 illustrate examples of change-of-flow instruction pipeline operation. FIG. 13 illustrates operation example of a pipeline flow of a branch instruction (which results in a BTB hit with a correct prediction of taken), regardless of being in ECC or parity mode. In one embodiment, simple change of flow instructions require either 3 cycles (if in parity mode) or 4 cycles (if in ECC mode) to refill the pipeline with the target instruction for taken branches and branch and link instructions which result in no BTB hit (i.e. which result in a BTB miss) and have been incorrectly predicted. For branch instructions, in some situations, these 3 to 4 cycles may be reduced by performing the target fetch speculatively while the branch instruction is still being fetched into the instruction buffer if the branch target address can be obtained from the BTB (i.e. if the branch target address hits a valid entry in the BTB and is predicted as taken). The resulting branch timing may reduce to a single clock when the target fetch is initiated early enough and the branch is correctly predicted. As illustrated in FIG. 13, the branch instruction resulted in a BTB hit and was correctly predicted, thus no stalls were incurred between execution of the branch instruction and its target instruction, regardless of whether in parity or ECC mode.

FIG. 14 shows an example of a case, in parity mode, in which a branch is incorrectly predicted or a BTB miss occurs, and therefore, 3 cycles are required to correct the misprediction outcome. In this example, the first instruction is a compare instruction and the second instruction is a branch instruction whose resolution is based on the result of the compare instruction. Also, note that the branch instruction was predicted to be not taken when, actually, it will be resolved as taken. Therefore, as shown in FIG. 14, the result of the compare instruction is available in E0. Therefore, the branch instruction can be resolved in the DEC stage. The branch will therefore be resolved as taken in this DEC stage, meaning that the target fetch (the IF0 stage for the target instruction, abbreviated as TF0) will occur in the subsequent time slot to that DEC stage. In this case, the branch misprediction in parity mode cost 3 cycles (for example, note that there are 3 cycles between the branch instruction entering the DEC stage and target instruction, i.e. the next instruction in the instruction stream for a taken branch, entering the DEC stage).

FIG. 15 shows an example of a case, in ECC mode, in which a branch is incorrectly predicted or a BTB miss occurs, and therefore, 4 cycles are required to correct the misprediction outcome. In this example, the first instruction is a compare instruction and the second instruction is a branch instruction whose resolution is based on the result of the compare instruction. Also, note that the branch instruction is predicted to be not taken when, actually, it will be resolved as taken. Also, since this example assumes operation in ECC mode, the execution of the compare instruction (since it is a single-cycle instruction) is moved from stage E0 to stage E1 (as described above, for example, with respect to FIG. 12). Therefore, as shown in FIG. 15, the result of the compare instruction is available in E1 rather than in E0. Therefore, the branch instruction cannot be resolved until the E0 stage, rather than the DEC stage, meaning that the target fetch (the IF0 stage for the target instruction, abbreviated as TF0) will occur in the subsequent time slot to that E0 stage. In this case, the branch misprediction in ECC mode cost 4 cycles (for example, note that there are 4 cycles between the branch instruction entering the DEC stage and target instruction, i.e. the next instruction in the instruction stream for a taken branch, entering the DEC stage). However, although the moving of the execution of the single-cycle compare instruction to the E1 stage due to operating in ECC mode results in an additional cycle to correct a misprediction outcome as compared to not moving the execution to E1 or as compared to parity mode, it may be that this situation occurs less often than the situations in which it can be advantageous to change the execution stage of a single-cycle instruction, since correct branch prediction allows for eliminating the penalty.

Figure 16:
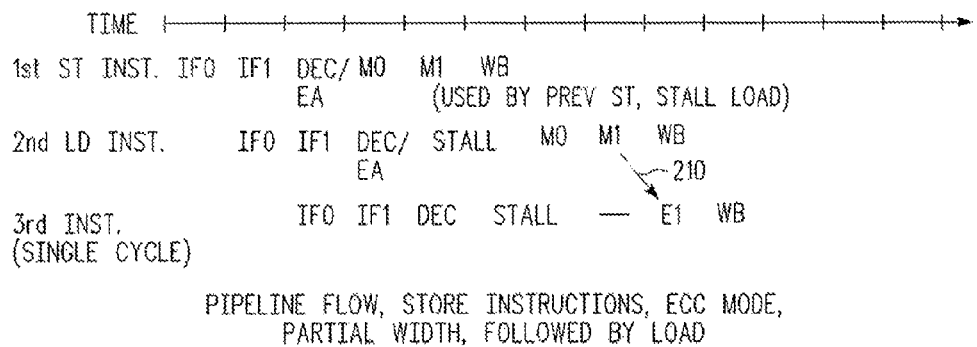

FIG. 16 illustrates an example pipeline flow, in ECC mode, with a partial width store instruction, followed by a load instruction, followed by a single-cycle instruction. A partial width store instruction, as discussed above, may refer to an instruction which performs a write to less than all banks within the memory. Since, in one embodiment as discussed above, a read-modify-write (RMW) is required for a partial store, the execution of the next load instruction cannot begin in M0 with no stalls. Instead, on a load which follows a partial store, a single stall is incurred. In ECC mode, for partial store instructions, the effective address is calculated in the DEC/EA stage, and memory (e.g. memory 28 or memory 16 or cache 26) is written in the M1 stage with the previous store instruction's data (as was described above in reference to FIG. 12, where this previous store instruction's data may be stored in a late write buffer such as late write buffer 102 until it is written to memory). Data is read in the M0 stage, and error detection, data modification, and ECC syndrome generation is performed in the M1 stage. The updated value may be sent to a buffer, such a late write buffer 102 for later storage to memory. The updated value may later be written to memory in the M1 stage of the next partial width store instruction (which is the stage in which the memory writes occur for partial width stores) or in the M0 stage of the next full width store instruction (which is the stage in which the memory writes occur for full width stores, since, as discussed above, a read access need not be performed prior to the write access).

Therefore, as seen in the example of FIG. 16, the second load instruction is stalled between the DEC/EA stage and the M0 stage, since during the M1 stage of the first instruction, the previous store instruction's data is written. This write operation requires two cycles since a RMW operation is needed, which is why the subsequent load instruction is stalled. Similarly, the third single-cycle instruction is stalled between the DEC stage and the delay stage (corresponding to the E0 stage), where execution occurs in the E1 stage, since ECC mode is enabled. Alternatively, note that the third single-cycle instruction can be stalled between the IF1 stage and the DEC stage.

Figure 17:
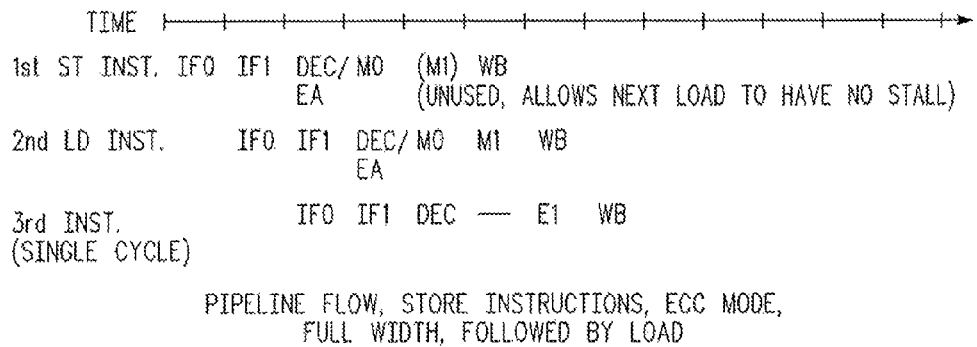

FIG. 17 illustrates an example pipeline flow, in ECC mode, with a full width store instruction, followed by a load instruction, followed by a single-cycle instruction. A full width store instruction, as discussed above, may refer to an instruction which performs a write to all banks within the memory. Since, in one embodiment as discussed above, a RMW is not required, the execution of the next load instruction can begin in the M0 stage rather than having to stall until after the M1 stage of the preceding store, as was the case in the example of FIG. 16. Therefore, in one embodiment, for a full width store, a following load instruction need not be stalled, unlike the case for a partial width store in which a following load instruction is stalled. In ECC mode, for full width store instructions, the effective address is calculated in the DEC/EA stage, and the memory (e.g. memory 28 or memory 16 or cache 26) is written in the M0 stage with the store data from a previous store instruction's data. Data is not read in the M0 stage. Instead, ECC syndrome generation may be performed, and the updated value is written to memory in M1 of the next partial width store instruction (which is the stage in which the memory writes occur for partial width stores since a RMW is required) or in M0 of the next full width instruction (in which no RMW is required). Therefore, in one embodiment when operating in ECC mode, based on the width of a write (e.g. a partial width store versus a full width store), the load instruction may be stalled upon a transition from a store instruction to the load instruction. Also, in ECC mode, a decision can be made to move the writing of previous store data of a previous store instruction to memory from M1 to M0, depending on whether the current store instruction is a partial or full width access. In one embodiment, the move from M1 to M0 only occurs when the current store instruction is an aligned full width access.

Figure 18:
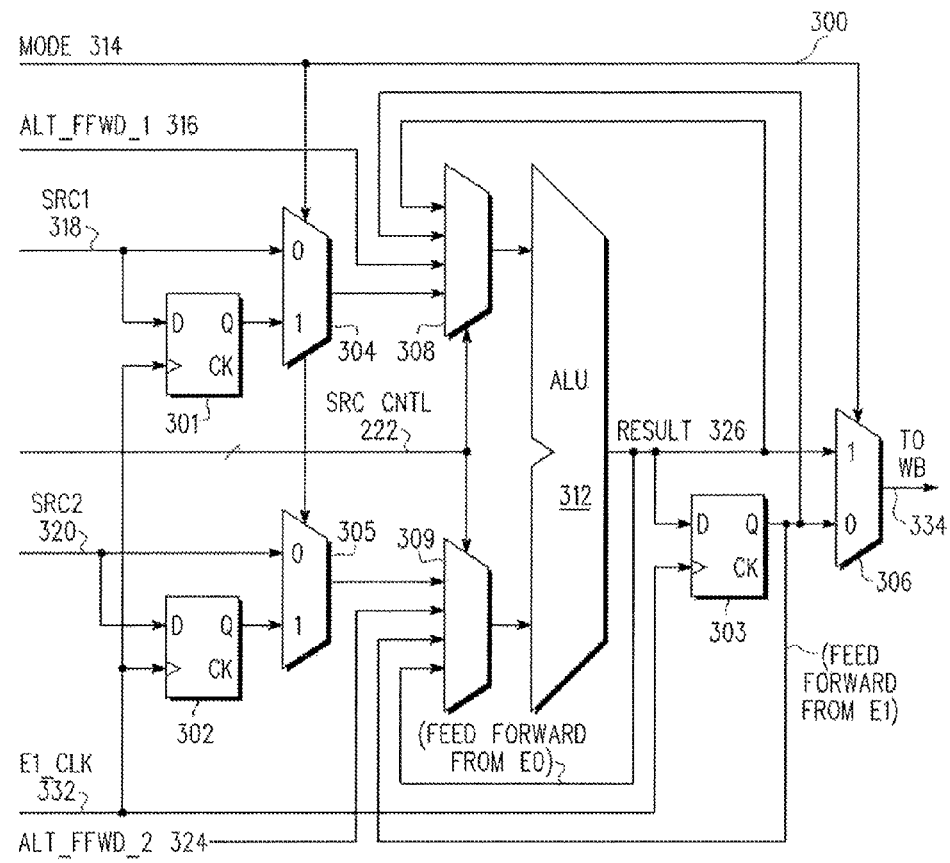
FIG. 18 illustrates a single cycle execution unit of the data processing system of FIG. 1 in accordance with one embodiment of the present invention.

FIG. 18 illustrates a single cycle execution unit 300 of the data processing system of FIG. 1 in accordance with one embodiment of the present invention. Execution unit 300 includes an arithmetic logic unit (ALU) 312 (where any ALU, as known in the art, may be used), latching multiplexers (MUXes) 308 and 309, multiplexers (MUXes) 304, 305, and 306, D-type flip-flops 301, 302, and 303. Note that flip-flops 301-303 can each be implemented with a variety of different types of storage elements. Also, note that rather than latching MUXes 308 and 309, a combination of a MUX with a storage element on its output may be used. Each of flip fops 301-303 receive an E1 clock signal 332 which controls timing of the E1 stage. Execution unit 300 also receives a mode indicator, mode 314. This mode indicator may be mode indicator 62 as described above, provided by mode logic 50, or, alternatively, the circuitry for controlling the mode (e.g. controlling whether ECC mode is enabled) may be replicated for the processor pipeline. In yet another embodiment, control register 48 and mode logic 50 may be located outside of the memory and shared by the memory and the pipeline circuitry rather than being replicated for the pipeline circuitry. Mode 314 is provided to the control inputs of each of MUXes 304-306 to select which input to each of the MUXes is provided as the corresponding output. MUX 304 receives a first source operand, SRC1 318 at a first data input and the output of flip flop 301 as a data second input. SRC1 318 is also provided to the data input of flip flop 301. MUX 305 receives a second source operand, SRC2 320 at a first data input and the output of flip flop 302 as a second data input. SRC2 320 is also provided to the data input of flip flop 302. MUX 308 receives the output of ALU 312 (result 326) as a first data input, the output of flip flop 303 as a second data input, a first feed forward input, alt_ffwd_1 316, as a third data input, the output of MUX 304 as a fourth data input, and a source control signal, SRC cntl 222, as a control input. MUX 308 latches its output prior to providing the output to a first input of ALU 312. MUX 309 receives the output of MUX 305 as a first data input, a second feed forward input, alt_ffwd_2 324, as a second data input, the output of flip flop 303 as a third data input, the output of ALU 312 (result 326) as a fourth data input, and SRC cntl 222 as a control input. MUX 309 latches its output prior to providing the output to a second input of ALU 312. Result 326 is provided to a first input of MUX 306 and to the data input of flip flop 303. The data output of flip flop 303 is provided to a second input of MUX 306, and the output of MUX 306 is provided as an output 334 of execution unit 300, to the WB stage circuitry.

In operation, execution unit 300 is capable of operating its timing to execute in either E0 or E1, depending on the mode of operation (e.g. whether ECC is enabled or not). Therefore, based on the value of mode 314, MUXes 304 and 305 provide either SRC1 318 and SRC2 320 as inputs to MUXes 308 and 309, respectively, or delayed versions of SRC1 318 and SRC2 320 as inputs to MUXes 308 and 309. For example, in one embodiment, a value of "0" for mode 314 indicates a non-ECC mode (for example, a value of "0" may indicate, in one embodiment, parity mode), and a value of "1" indicates ECC mode. Therefore, in non-ECC mode, SRC1 318 and SRC2 320 are provided directly as inputs to MUXes 308 and 309 (where a value of "0" for mode 314 selects the first inputs of MUXes 304 and 305), since execution by execution unit 300 is to occur in the first execution stage E0, as was described above. However, in ECC mode, execution of a single-cycle instruction is moved from the first execution stage, E0, to the second execution stage, E1. Therefore, the second inputs of MUXes 304 and 305 are selected (due to the value of mode 314 being "1" for ECC mode), which hold the values of SRC1

318 and SRC2 320, respectively, for an additional clock cycle. When E1_CLK 332 is asserted (indicating stage E1), then flip-flops 301 and 302 capture SRC1 318 and SRC2 320 values provided in stage E0 to subsequently provide to MUXes 308 and 309.

Also, execution unit 300 can feedforward results from either stage E0 or stage E1. For example, when result 326 is fed back as inputs to MUXes 308 and 309, they correspond to feed forwarded results from stage E0. Similarly, when the output of flip flop 303 is fed back as inputs to MUXes 308 and 309, they correspond to feed forwarded results from stage E1 (where note that the output of flip flop 303 is provided with E1_CLK 332, which corresponds to result 326 being captured at E1 rather than E0). In ECC mode, mode 314 selects the first input of MUX 306 which provides result 326 at output 334 (for the WB stage) at the end of E1. However, in a non-ECC mode, mode 314 selects the second input of MUX 306 which provides result 326 at output 334 (for the WB stage) at the end of E1, due, for example, to the use of flip-flops 301-303 timed by E1_CLK 332, which hold SRC1 318, SRC2 320, and result 326 through stage E0 to stage E1. Therefore, as discussed above, stage E0 effectively becomes a delay stage. In this manner, in ECC mode, execution unit 300 is able to move execution of a single-cycle instruction from E0 to E1.

By now it should be appreciated that there has been provided memories capable of operating in either parity or ECC mode. Furthermore, in ECC mode, a partial write (i.e. a write to less than all banks in the memory) can be performed with multiple accesses, including both a read access and a write access (for performing a RMW). However, as described herein, memories have been described which, in ECC mode, a full write (i.e. a write to all the banks in the memory) can be performed with a single access, i.e. in one access. That is, the full write can be performed with a single write access without the need for a read access prior to the write access. In this manner, memories may operate more efficiently when in ECC mode than was previously available. Also, in accordance with one embodiment, a memory has been described which, for a partial write in ECC mode, allows only those banks that are not being written to with the partial write to be read for the read access portion of a RMW operation. While correctness of the check bits and the generation of the syndrome bits cannot be guaranteed correct in this embodiment, there may be situations where this may be allowed, manageable, or even desired. Also, in accordance with one embodiment, a memory has been described which, for a partial write in ECC mode, allows for only those banks that are written to with the partial write to be updated, along with protection storage containing check bits for the full width of data stored by the memory entry. Furthermore, in accordance with one embodiment, a memory has been described which, for a partial write in ECC mode, additionally allows for those banks which required correction during the read portion of the read-modify-write operation to be written with the corrected read data, along with those banks corresponding to the partial write to be updated, as well as updating protection storage containing check bits for the full width of data stored by the memory entry.

Also, as described herein, a processor pipeline may be configured differently when operating in ECC mode versus a non-ECC mode. For example, in ECC mode, execution of single cycle instructions can be moved from one execution stage to another, or the sending of write data may be moved from one execution stage to another. Therefore, based on whether processor 12 or a memory is running in ECC mode or a non-ECC mode, the processor pipeline can be configured differently. Also, based on a memory alignment in a non-ECC mode, the execution of single cycle instructions can be moved from one execution stage to another.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of data processing system 10 are circuitry located on a single integrated circuit or within a same device. Alternatively, data processing system 10 may include any number of separate integrated circuits or separate devices interconnected with each other. For example, memory 16 may be located on a same integrated circuit as processor 12 or on a separate integrated circuit or located within another peripheral or slave discretely separate from other elements of data processing system 10. Peripherals 18 and 20 may also be located on separate integrated circuits or devices. Also for example, data processing system 10 or portions thereof may be soft or code representations of physical circuitry or of logical representations convertible into physical circuitry. As such, data processing system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of data processing system 10, for example, from computer readable media such as memory 16 or other media on other computer systems. Such computer readable media may be permanently, removably or remotely coupled to an information processing system such as data processing system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, data processing system 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. For example, the number of bits used in the address fields may be modified based upon system requirements. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

ADDITIONAL TEXT

1. A method, comprising:
   providing a data processor having an instruction pipeline (for example, in CPU 30), wherein the instruction pipeline has a plurality of instruction pipeline stages (for example, see FIG. 6), and wherein the plurality of instruction pipeline stages comprise a first instruction pipeline stage (for example, M0) and a second instruction pipeline stage (for example, M1);
   providing a data processor instruction (for example, a simple instruction that uses only one pipeline execution stage) that causes the data processor to perform a first set of computational operations during execution of the data processor instruction;
   performing the first set of computational operations in the first instruction pipeline stage (for example, M0) if the data processor instruction is being executed and a first mode has been selected; and
   performing the first set of computational operations in the second instruction pipeline stage (for example, M1) if the data processor instruction is being executed and a second mode has been selected.
2. A method as in item 1, further comprising:
   providing a memory (for example, 28, 16, 26) having a plurality of modes, wherein the plurality of modes comprise the first mode and the second mode.
3. A method as in item 1, wherein the first mode comprises a parity protected mode.
4. A method as in item 1, wherein the second mode comprises an error correction code (ECC) protected mode.
5. A method as in item 1, wherein the first set of computational operations comprises an integer operation.
6. A method as in item 1, wherein if the first mode has been selected and execution of the first set of computational operations occurs in the first instruction pipeline stage, the data processor instruction has a first latency, and wherein if the second mode has been selected and execution of the first set of computational operations occurs in the second instruction pipeline stage, the data processor instruction still has the first latency.
7. A method as in item 1, further comprising:
   providing a second data processor instruction (for example, an instruction which requires two or more pipeline execution stages) that causes the data processor to perform a second set of computational operations during execution of the second data processor instruction; and
   using both the first instruction pipeline stage and the second instruction pipeline stage when performing the second set of computational operations during execution of the second data processor instruction.
8. A method as in item 7, wherein execution of the second data processor instruction uses both the first instruction pipeline stage and the second instruction pipeline stage regardless of whether the first mode or the second mode is selected.

9. A method as in item 7, wherein a number of pipeline stalls due to a data-dependent instruction on a load remains unchanged regardless of whether the first mode or the second mode is selected.
10. A method as in item 1, further comprising:
    providing a storage circuit (for example, 48) for storing a value, wherein the value determines whether the first mode or the second mode is selected.
11. A system, comprising:
    a processor (for example, 12, 30) comprising a pipeline, wherein the pipeline comprises:
        a plurality of pipeline stages (see, for example, FIG. 6), wherein the plurality of pipeline stages comprise a prior pipeline stage (for example, M0) and a subsequent pipeline stage (for example, M1);
        feedforward logic (for example, logic within CPU 30 used to implement the functionality of the "FF" operation illustrated and described in the pipeline examples of FIGS. 7-17) to provide computational results obtained from the subsequent pipeline stage to the prior pipeline stage; and
        feedforward control circuitry which selects a first set of feedforward control values (for example, values for mode 314 and SRC CNTL 222) to provide to the feedforward logic during execution of a first data-dependent instruction if a first mode has been selected, and which selects a second set of feedforward control values (for example, values for mode 314 and SRC CNTL 222) to provide to the feedforward logic during execution of the first data-dependent instruction if a second mode has been selected, wherein the first set of feedforward control values and the second set of feedforward control values are different (for example, feedforward control circuitry may be any circuitry within CPU 30 used to implement this functionality, see also, for example, FIG. 18).
12. A system as in item 11, wherein the prior pipeline stage performs a first set of computational operations if the first data-dependent instruction is being executed and the first mode has been selected, and wherein the subsequent pipeline stage performs the first set of computational operations if the first data-dependent instruction is being executed and the second mode has been selected.
13. A system as in item 12, wherein if the first mode has been selected and execution of the first set of computational operations occurs in the prior pipeline stage, the first data-dependent instruction has a first latency, and wherein if the second mode has been selected and execution of the first set of computational operations occurs in the subsequent pipeline stage, the first data-dependent instruction still has the first latency.
14. A system as in item 12, wherein the first set of computational operations comprises an integer operation.
15. A system as in item 11, further comprising:
    a memory (for example, 28, 16, 26) having a plurality of modes, wherein the plurality of modes comprise the first mode and the second mode.
16. A system as in item 11, wherein the first mode comprises a parity protected mode.
17. A system as in item 11, wherein the second mode comprises an error correction code (ECC) protected mode.
18. A system as in item 11, wherein the data processor performs a second set of computational operations during execution of a second data-dependent instruction, and wherein both the prior pipeline stage and the subsequent pipeline stage are used when performing the second set of computational operations during execution of the second data-dependent instruction regardless of whether the first mode or the second mode is selected.
19. A method, comprising:
    providing a data processor having an instruction pipeline (for example, in CPU 30), wherein the instruction pipeline has a plurality of instruction pipeline stages (for example, see FIG. 6), and wherein the plurality of instruction pipeline stages comprise a first instruction pipeline stage (for example, M0) and a second instruction pipeline stage (for example, M1);
    providing a load instruction;
    providing a data-dependent instruction;
    executing the data-dependent instruction in the first instruction pipeline stage if a most recently executed instruction was the load instruction and if the most recently executed instruction was aligned; and
    executing the data-dependent instruction in the second instruction pipeline stage if the most recently executed instruction was the load instruction and if the most recently executed instruction was misaligned and if a first mode is selected.
20. A method as in item 19, further comprising:
    executing the data-dependent instruction in the first instruction pipeline stage if the most recently executed instruction was the load instruction and if the most recently executed instruction was misaligned and if a second mode is selected.

What is claimed is:
1. A method, comprising:
   providing a data processor having an instruction pipeline, wherein the instruction pipeline has a plurality of instruction pipeline stages, and wherein the plurality of instruction pipeline stages comprise a first instruction pipeline stage and a second instruction pipeline stage;
   providing a load instruction to the instruction pipeline;
   providing a data-dependent instruction to the instruction pipeline;
   executing the data-dependent instruction in the first instruction pipeline stage if a most recently executed instruction was the load instruction and if the most recently executed instruction was for aligned memory access;
   executing the data-dependent instruction in the second instruction pipeline stage if the most recently executed instruction was the load instruction and if the most recently executed instruction was for misaligned memory access and if a first mode is selected; and
   executing the data-dependent instruction in the first instruction pipeline stage if the most recently executed instruction was the load instruction and if the most recently executed instruction was for misaligned memory access and if a second mode is selected.
2. A method as in claim 1, wherein the first mode comprises a parity protected mode and the second mode comprises an error correction code (ECC) protected mode.
3. A method as in claim 1, wherein the data-dependent instruction comprises an arithmetic instruction.
4. A method as in claim 1 wherein the data-dependent instruction comprises a logic instruction.
5. A method for executing instructions in a data processor having an instruction pipeline, wherein the instruction pipeline comprises a plurality of instruction pipeline stages including a first instruction pipeline stage and a second instruction pipeline stage, comprising:
   providing a load instruction to the instruction pipeline;

providing a data-dependent instruction to the instruction pipeline;
determining an error detection mode operating on the instruction pipeline;
executing the data-dependent instruction in the first instruction pipeline stage if a most recently executed instruction was the load instruction and if the most recently executed instruction was for aligned memory access;
executing the data-dependent instruction in the second instruction pipeline stage if the most recently executed instruction was the load instruction and if the most recently executed instruction was for misaligned memory access and if the determined error detection mode is a parity protected mode.

* * * * *